United States Patent Office 2,860,074
Patented Nov. 11, 1958

2,860,074

VINYL RESIN-ACRYLIC ESTER-ORGANOPOLY-SILOXANE COATING COMPOSITIONS AND METHOD OF COATING WITH SAME

Robert C. Hedlund, Midland, Mich., assignor to Dow Corning Corporation, Midland, Mich., a corporation of Michigan No Drawing. Application November 3, 1954
Serial No. 466,669

6 Claims. (Cl. 117—132)

The present invention relates to a novel composition of matter and to the use of such compositions to form a protective film or coating on certain metal surfaces.

The use of large quantities of chromium plating on the trim of automobiles has led to the serious problem in the protection of such chrome plated surfaces from the deleterious effects of weather, salt spray, atmospheric corrosion, and other such effects. It is well known that the chrome plating on the bumpers, hub caps, grill work and other trim on many of the automobiles now in use is not sufficiently heavy and/or continuous to prevent water and other materials from penetrating through the plating to the underlying base metal, usually iron or steel. It is well known that when relatively non-corrosive water and/or water vapor pass through the minute pin-holes in the chrome plating, the resulting rusting of the iron or steel base of the metal piece will result in an unsightly rust spot and/or peeling off of chrome plating and in general will ruin the appearance of the trim piece. Salt solutions and corrosive gases which are present in the atmosphere around chemical plants and industrial centers are even more harmful to the chrome trim than is plain water.

Many expedients are currently employed to prevent or to reduce the deterioration of chrome plating. Various types of films have been used to cover the chrome. Some of these films, such as paste waxes, are difficult to apply, reduce the luster of the chrome trim, and afford only temporary protection at best. The more permanent films are subject to discoloration with time, peeling off, and are difficult to apply and difficult to remove for recoating. Further, the films heretofore known did not afford adequate protection to the chrome surface and the effects of weather, salt and so on were merely reduced and not eliminated.

It is an object of this invention to prepare a film-forming composition of matter which will protect chrome plated articles from the ravages of weather, salt solution, corrosive gases and so forth. Another object of this invention is to prepare a protective coating composition which can be easily applied to a chrome surface. A further object is a composition which will not perceptibly discolor with age when applied to a chrome surface. Further objects and advantages of this invention are detailed in or will be apparent from the following specification and appended claims.

This invention relates to a composition of matter consisting essentially of 10 to 55 percent by weight of a film-forming vinyl resin, 40 to 85 percent by weight of an alkyl ester of an organic acid selected from the group consisting of acrylic acid and methacrylic acid, and 5 to 50 percent by weight of an alkyl-aryl polysiloxane having on the average from 1 to 3 organic radicals per silicon atom in the molecule, with not more than 90 percent of the total organic radicals being alkyl groups.

The vinyl resins which are operable herein are well known film-forming resins. These resins can be homopolymers of such compositions as vinyl chloride, vinyl alcohol, and vinyl esters such as vinyl acetate and vinyl butyrate. The film-forming resins can also be copolymers of such compositions with each other or they can be copolymers of vinylidene chloride with any of said vinyl compounds, i. e. vinyl chloride, vinyl esters or vinyl alcohol. In addition the film-forming vinyl resins can be mixtures of any of the aforesaid homopolymers or copolymers.

Esters of acrylic and methacrylic acids and methods of producing such esters are well known in the art. The esters which are operable herein are the alkyl esters of acrylic and methacrylic acids such as, for example, methyl acrylate, ethyl acrylate, n-propyl acrylate, stearyl acrylate, n-butyl acrylate, methyl methacrylate, ethyl methacrylate, n-propyl methacrylate, isobutyl methacrylate and n-butyl methacrylate. The alkyl esters having from 1 to 4 inclusive carbon atoms in the alkyl groups are preferred.

The organopolysiloxanes operable herein are polymeric and copolymeric organopolysiloxanes having an average of from 1 to 3 organic groups per silicon atom. The organic groups attached to the silicon atoms can be alkyl radicals such as methyl, ethyl, propyl and dodecyl, and aryl groups such as phenyl, xenyl, naphthyl and tolyl. Not more than 90 percent of said organic radicals can be alkyl radicals. Organosiloxane resins having from 1 to 1.8 organic radicals per silicon atom are preferred, but up to 25 percent by weight of the total organopolysiloxane can be a fluid having a degree of substitution in the range of 2.0 to 3.0. The organopolysiloxanes which are operable herein vary from toluene soluble gums having viscosities exceeding 10,000,000 cs. at 25° C. to fluids having viscosities as low as 5 cs. at 25° C. The organopolysiloxanes which are relatively non-volatile at normal temperatures are preferred herein.

The compositions of this invention can be simply and easily admixed. Each of the components, the vinyl resin, the alkyl ester of acrylic or methacrylic acid, and the alkyl-aryl siloxane, is dissolved in an organic solvent such as toluene or methylisobutyl ketone. The components can then be admixed in any desired order but it is preferred that the less viscous solution be gradually admixed into the more viscous solution. The admixing can be carried out on a two or three roll mill or on any other of the well-known devices for mixing and blending such materials.

The mixture of vinyl resin, alkyl ester of methacrylic or acrylic acid and alkyl-aryl siloxane is applied to the chrome in the form of a solution in organic solvents. The solution can contain almost any desired percentage of solids depending upon the nature and amounts of the various constituents present but it is preferred that there be from 10 to 35 percent by weight solids in the solution. The application of the compositions of this invention to chrome plated surfaces can be accomplished by brushing, spraying, dipping or any other desired means. It is commercially feasible and attractive to package this chrome protecting coating composition in an aerosol bomb enabling the consumer to apply the coating in a thin, even film.

After the coating is applied, it air-dries to a clear, hard surface. This surface is remarkably resistant to weathering, atmospheric corrosion, road dirt, and salt spray from the road or in the atmosphere. The film does not discolor as it ages but remains clear. It does not peel off of the surface and refinishing about once a year will assure an even impenetrable coating on the chromium. Of course, elimination of rust and corrosion makes the job of cleaning the chrome much easier.

Many and varied practical applications and uses for the compositions of this invention on any metallic or nonmetallic surface will be apparent to and will occur to those skilled in the art, and this invention is by no means restricted to the use of these compositions on automobile trim.

The following examples will serve to give those skilled in the art a better understanding of this invention. All of the examples are merely illustrative and are not to be construed as limiting this invention, the scope of which is properly delineated in the appended claims.

All parts and percentages in the examples are based on weight unless otherwise stated.

*Example 1*

15 parts of a vinyl resin comprising a copolymer of 91 percent vinyl chloride, 3 percent vinyl acetate and 6 percent vinyl alcohol, were dissolved in 42.5 parts of toluene and 42.5 parts of methylisobutyl ketone. 60 parts of n-butyl methacrylate dissolved in 90 parts of aromatic petroleum naphtha solvent were added and mixed therewith. Then, 25 parts of an organopolysiloxane resin comprising 25 mol percent $CH_3SiO_{3/2}$, 35 mol percent $C_6H_5SiO_{3/2}$, 20 mol percent $(CH_3)_2SiO$ and 20 mol percent $(C_6H_5)_2SiO$ dissolved in 16.7 parts xylene were added. 33.3 parts of methylisobutyl ketone, 25 parts of an aromatic petroleum solvent and 50 parts of ethylene glycol monoethyl ether were added to the mixture to give a solution containing 100 parts solid in 400 parts of solution or 25 percent solids in solution.

This solution was painted on the clean surface of chromium plated bumpers on an automobile. After 1 year of constant exposure to wind, rain, snow, ice and other climatic phenomena found in the northern portion of the United States, as well as to salt spray resulting from the spreading of salt on ice and snow on the highways during the winter months, the surface coating remained intact, had not discolored, and had provided maximum protection for the underlying chromium which was totally free of rust or other deleterious effects. The coated chromium surface was easily washed and cleaned. A second coating of the solution prepared as in paragraph 1 of this example was easily applied thus assuring maximum protection from year to year.

*Example 2*

When methyl acrylate or butyl acrylate is substituted for the n-butyl methacrylate of Example 1, and an organopolysiloxane containing hexyl and xenyl radicals is substituted for the phenylsiloxane of Example 1, equivalent results are obtained.

*Example 3*

When a vinyl resin composed of a copolymer of 10 percent vinylidene chloride, 81 percent vinyl chloride, 3 percent vinyl acetate and 6 percent vinyl alcohol is substituted for the vinyl resin of Example 1, equivalent results are obtained.

That which is claimed is:

1. A composition of matter consisting essentially of: (a) 10 to 55 percent by weight of a film-forming vinyl resin selected from the group consisting of homopolymers of vinyl alcohol and vinyl esters, copolymers of any of these vinyl compounds with each other, copolymers of any of the aforesaid vinyl compounds with vinylidene chloride and mixtures of said homopolymers and copolymers; (b) 40 to 85 percent by weight of an alkyl ester of an organic acid selected from the group consisting of methacrylic acid and acrylic acid wherein the alkyl groups contain less than 5 carbon atoms; and (c) 5 to 50 percent by weight of an alkyl-aryl polysiloxane having an average of from 1 to 1.8 organic radicals per silicon atom in the molecule, wherein not more than 90 percent of said organic radicals are alkyl groups.

2. A composition of matter consisting essentially of: (a) 15 percent by weight of a vinyl resin comprising a copolymer of 91 percent vinyl chloride, 3 percent vinyl acetate and 6 percent vinyl alcohol; (b) 60 percent by weight of n-butyl methacrylate; and (c) 25 percent by weight of an organopolysiloxane resin comprising 25 mol percent $CH_3SiO_{3/2}$, 35 mol percent $C_6H_5SiO_{3/2}$, 20 mol percent $(CH_3)_2SiO$, and 20 mol percent $(C_6H_5)_2SiO$.

3. A method of protecting chrome plated surfaces against corrosion consisting essentially of coating such surfaces with a solution of organic solvents containing 10 to 35 percent solids consisting essentially of: (a) 10 to 55 percent by weight of a film-forming vinyl resin selected from the group consisting of homopolymers of vinyl alcohol and vinyl esters, copolymers of any of these vinyl compounds with each other, copolymers of any of the aforesaid vinyl compounds with vinylidene chloride and mixtures of said homopolymers and copolymers; (b) 40 to 85 percent by weight of an alkyl ester of an organic acid selected from the group consisting of methacrylic acid and acrylic acid, wherein the alkyl groups contain less than 5 carbon atoms; and (c) 5 to 50 percent by weight of an alkyl-aryl polysiloxane having an average of from 1 to 1.8 organic radicals per silicon atom in the molecule, wherein not more than 90 percent of said organic radicals are alkyl groups.

4. A method of protecting metallic surfaces against corrosion consisting essentially of coating such surfaces with a solution of organic solvents containing 10 to 35 percent solids consisting essentially of: (a) 10 to 55 percent by weight of a film-forming vinyl resin selected from the group consisting of homopolymers of vinyl alcohol and vinyl esters, copolymers of any of these vinyl compounds with each other, copolymers of any of the aforesaid vinyl compounds with vinylidene chloride and mixtures of said homopolymers and copolymers; (b) 40 to 85 percent by weight of an alkyl ester of an organic acid selected from the group consisting of methacrylic acid and acrylic acid, wherein the alkyl groups contain less than 5 carbon atoms; and (c) 5 to 50 percent by weight of an alkyl-aryl polysiloxane having an average of from 1 to 1.8 organic radicals per silicon atom in the molecule, wherein not more than 90 percent of said organic radicals are alkyl groups.

5. A composition of matter consisting essentially of: (a) 10 to 55 percent by weight of polyvinyl chloride resin; (b) 40 to 85 percent by weight of an alkyl ester of methacrylic acid wherein the alkyl groups contain less than 5 carbon atoms; and (c) 5 to 50 percent by weight of an alkyl-aryl polysiloxane having an average of from 1 to 1.8 organic radicals per silicon atom in the molecule, wherein not more than 90 percent of said organic radicals are alkyl groups.

6. A method of protecting metallic surfaces against corrosion consisting essentially of coating such surfaces with a solution of organic solvents containing 10 to 35 percent solids consisting essentially of the composition of claim 5.

References Cited in the file of this patent

UNITED STATES PATENTS

| | | |
|---|---|---|
| 2,258,222 | Rochow | Oct. 7, 1941 |
| 2,481,349 | Robie | Sept. 6, 1949 |
| 2,705,690 | Nelson et al. | Apr. 5, 1955 |